Aug. 14, 1956   E. R. MANLEY   2,759,145
APPARATUS FOR TESTING MOTOR WINDINGS
Filed March 24, 1952   4 Sheets-Sheet 1
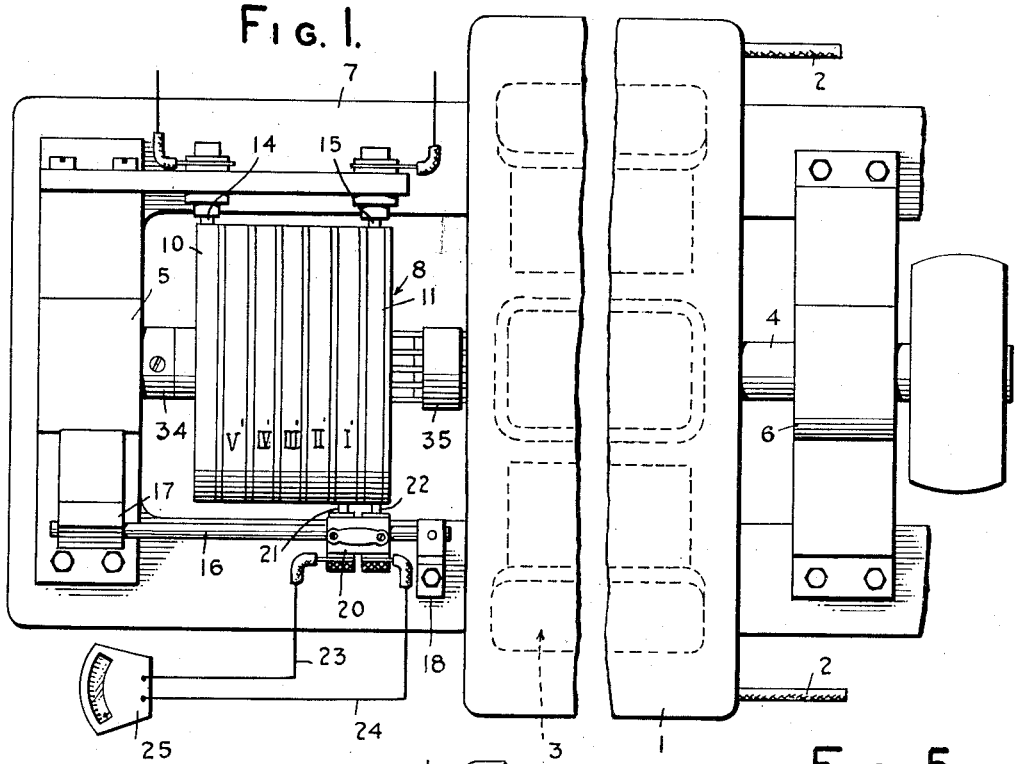
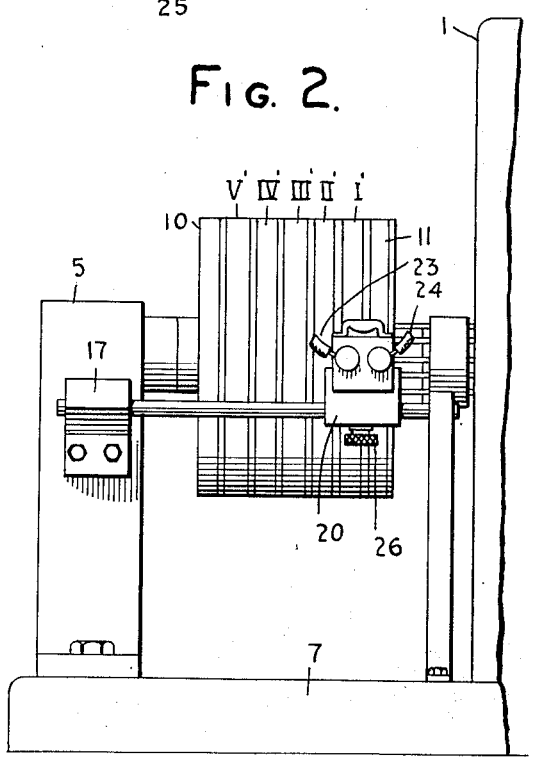
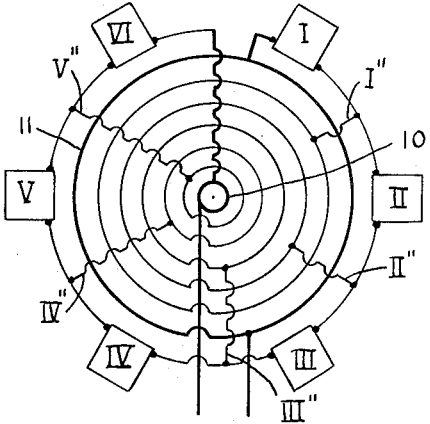
INVENTOR
EVERETT R. MANLEY
BY *Albert L. Frey*
ATTORNEY Aug. 14, 1956     E. R. MANLEY     2,759,145
APPARATUS FOR TESTING MOTOR WINDINGS
Filed March 24, 1952     4 Sheets-Sheet 2

INVENTOR
EVERETT R. MANLEY
BY *Albert Q. Krieg*
ATTORNEY

Aug. 14, 1956     E. R. MANLEY     2,759,145
APPARATUS FOR TESTING MOTOR WINDINGS
Filed March 24, 1952     4 Sheets-Sheet 3

INVENTOR
EVERETT R. MANLEY
BY *Albert Q. Fray*
ATTORNEY

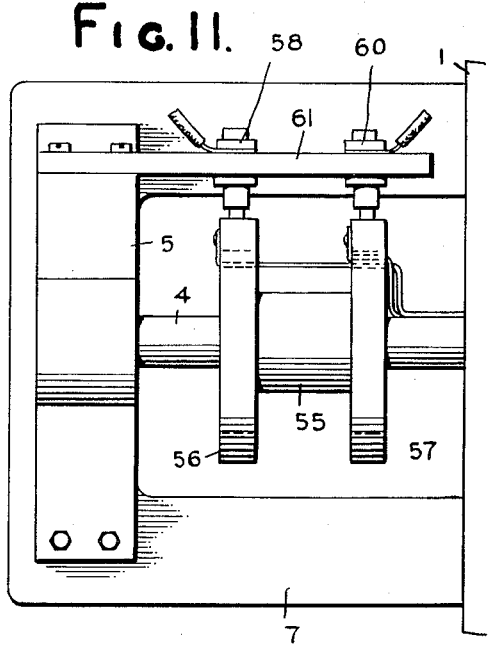
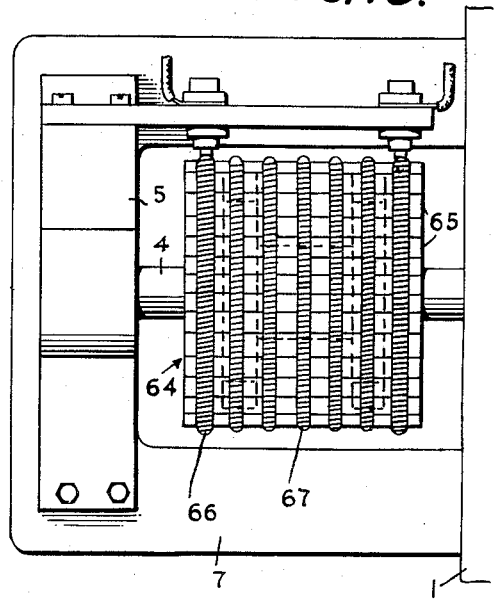
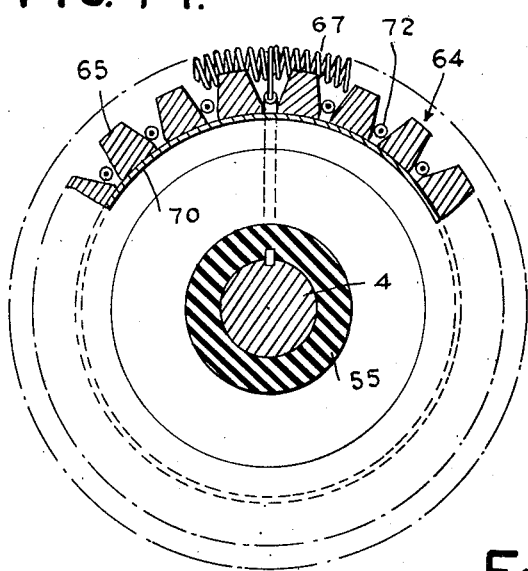
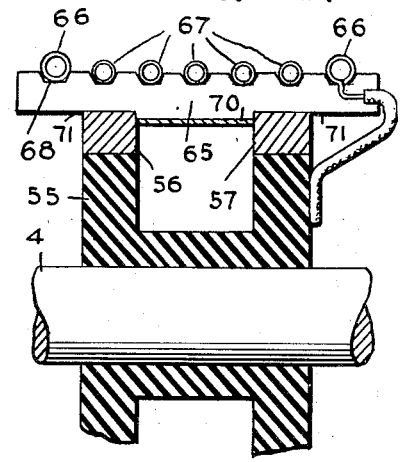
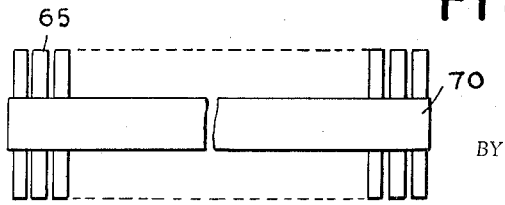

United States Patent Office 2,759,145
Patented Aug. 14, 1956

2,759,145

APPARATUS FOR TESTING MOTOR WINDINGS

Everett R. Manley, Fairmont, W. Va.

Application March 24, 1952, Serial No. 278,185

9 Claims. (Cl. 324—51)

This invention relates to a method of and apparatus for testing the coils of a wound-rotor type motor and particularly for testing said coils thereof under operating conditions.

In industrial wound-rotor synchronous motors, faults often develop during operation due to partial or total shorting of one or more of the windings of the coils of the rotor. These faults are usually caused by worn or moist insulation or otherwise faulty material and may not be evident when the rotor is stationary. However, when the motor is in operation, pressure between individual windings of the coils, due to centrifugal force occasioned by the revolution of the rotor, will often cause partial or complete shorts between individual windings of the coils to reach serious proportions.

When a partial short circuit occurs between windings in a coil of a wound-rotor motor, heating occurs, the severity thereof depending upon the seriousness of the short and the number of windings involved. From the standpoint of economy at least, it is important that the faulty coil be repaired or replaced at an early stage. When a synchronous motor indicates coil deficiency generally by overheating or vibration due to short circuiting, it is common practice to stop the motor, remove the coils, test them and repair or rewind one or more of the coils as occasion may require. This practice is not only time consuming and expensive, but testing under these circumstances frequently does not show deficiency or fault existing in the coil under suspicion. For example, a coil when stationary or upon a work-bench may not show a short circuit in a voltage test over other identical coils in satisfactory condition despite the fact that the coil is suspected under normal operation of the motor. Short of unwinding the coil there is no way of determining the condition of the coil.

In the early stages ordinary testing devices often are inadequate to identify positively the offending coil. The method and apparatus herein disclosed provides for positively identifying the coil causing the heating by testing it under operating conditions wherein the heating occurs. To obviate the uncertainties of testing the coils in the manner above described the method and apparatus herein disclosed proposes and effects a testing of the coils under normal operating conditions or speed so that the windings of the coils occupy their precise operating positions imposed by centrifugal force arising from the rotation of the rotor. In this manner the coil is tested under the precise conditions which have suggested the presence of a short circuit in one or more of the coils.

It is impractical in many cases to disassemble the coils of a large motor, carry them to a shop and give each individually a complete test. This invention contemplates the use of a testing device that will enable a complete and thorough test to be given all coils in situ under operating conditions, or in other words, while running the motor at synchronous speed and at the place of installation of the motor.

It is therefore an object of this invention to provide a method and apparatus for testing the individual coils of a wound-rotor type motor while said motor is in operation.

Another object of this invention is to provide a testing device by which the individual coils of a wound-rotor synchronous motor may be tested and replaced if necessary in the location where the motor is installed.

A further object of the invention is to provide a testing device which will definitely determine the faulty coil which is causing motor heating and thereby permit its removal and replacement by a satisfactory coil without removing or disassembling the remaining coils.

Still another object of this invention is to provide a testing device which will accurately identify all coils in which the windings are faulty even when the fault is in its incipiency.

These and other objects will be apparent to those skilled in the art from the disclosure in the specification and in the drawings, in which Fig. 1 is a plan view showing a synchronous motor of the wound-rotor type having a drum affixed to the rotor shaft;

Fig. 2 is a side view of the drum and contact device shown in Fig. 1;

Fig. 5 is a diagrammatic circuit diagram showing the collector ring circuit in heavy lines and the coil testing circuit in light lines;

Fig. 11 is a diagrammatic plan view indicating the collector rings and brushes of a standard motor;

Fig. 13 is a plan view of portions of a standard motor illustrating one form of temporary drum construction;

Fig. 14 is an enlarged transverse sectional view illustrating the arrangement of the segments shown in Fig. 13;

Fig. 15 is a longitudinal section showing the permanent collector rings represented in Fig. 11 with the segments shown in Fig. 13 applied thereto;

Fig. 16 illustrates the continuous band of segments which may be utilized to constitute the temporary drum shown in Fig. 13.

Figure 3:
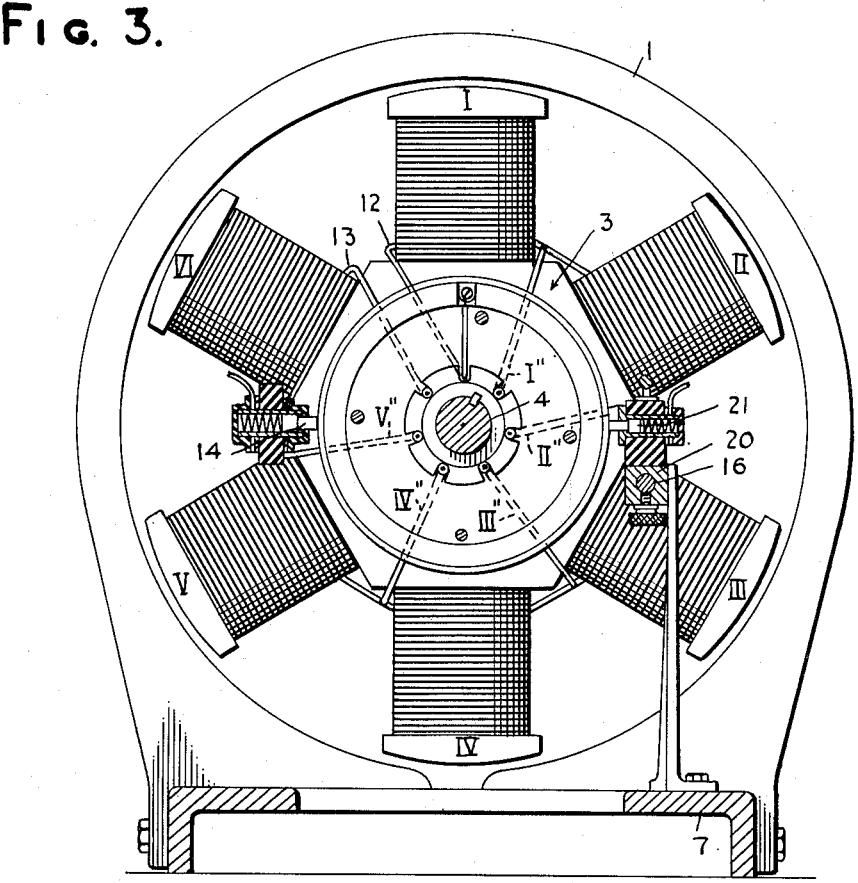
Fig. 3 is an end view, with several parts shown in section illustrating the coils, the direct current brushes, and the contact or coil testing device.

In Figs. 1 and 3 there is conventionally shown synchronous motor parts including the usual stator 1, with leads 2 to a source of alternating current, not shown. The rotor 3 is of the usual type and as here shown for convenience includes six wound coils I, II, III, IV, V and VI. The rotor shaft 4 is mounted in the usual bearing blocks 5 and 6 rising from the base plate 7. The motor so far described may be of any standard type and the number of field coils embodied in a particular motor is immaterial since the present invention can be applied thereto regardless of the number of coils.

The invention herein disclosed involves two aspects, but nevertheless the same generic idea. The invention may be included as a permanent part of the motor at the time of its manufacture or thereafter or it may be applied temporarily to any standard motor for testing and indicating purposes and then easily removed therefrom.

Examples of a permanent installation will now be described. Referring to Figs. 1 and 3, a drum 8 fast to the rotor shaft 4 is shown as supporting at its periphery the usual collector rings 10 and 11 electrically connected by the wires or cables 12 and 13 to the series of field coils I to VI inclusive. Direct current from any suitable source, not shown, is supplied to the coils, through the collector rings, for field excitation by means of the usual brushes 14 and 15. Intermediate the collector rings 10 and 11 are a plurality of spaced rings I', II', III', IV' and V', each connected to its complementary field coil by the wires I'', II'', III'', IV'' and V'''.

On the side of the drum opposite the brushes 14 and 15 is a horizontal shaft 16 carried in brackets 17 and 18, on which is slidably and rotatably mounted a block 20 fashioned from insulating material carrying two contacts 21 and 22 so spaced that they will engage a collector ring and the next adjacent coil ring, for example 11 and I' respectively or any two adjacent coil rings for example I' and II'. The contacts 21 and 22 of the block 20 are connected by means of leads 23 and 24 to a voltmeter 25.

When a testing of the coils is not indicated the block 20 may be swung about the shaft 16 and away from the drum and locked in that position by the screw 26. Conversely, when a test is desired the screw 26 may be loosened whereupon the block and its contacts are free to move lengthwise of the shaft 16 for coil testing.

In order to obtain an indication of the condition of any coil, the block 20 is moved along the shaft from right to left or vice versa, and as it makes contact of the two adjacent rings (a collector ring and adjacent coil ring or two adjacent coil rings) the circuit is closed through the field coil, and thus gives an indication of its I. R. drop on the voltmeter.

It is preferable to apply some identifying mark upon each coil and a corresponding mark upon its complementary coil ring. In this way the defective coil may be identified instantly by the position of the contacts 21, 22 on the particular coil ring when a drop in voltage is indicated at that position.

Referring to the circuit diagram in Fig. 5, in which the collector ring circuit is shown in heavy lines and the coil testing circuits in light lines, the testing operation will be described as with the block 20 in the position shown in Fig. 1. The bridging of the collector ring 11 and the coil ring I' will cause current to flow through the coil I. Now, if there occurs any short or partial short between individual windings in this coil, it will be at once indicated on the voltmeter. This test may of course be made when the rotor is stationary. However, it is pointed out that if the insulation is only slightly worn, or in the case of an enameled wire, only barely cracked, it is quite possible that no unstandard condition will be indicated. However, when the motor is running, centrifugal force will tend to throw the individual windings of the coils 1s closer together so that any fault, no matter how slight, in the insulation will be show. It will be apparent from a study of Fig. 3 how such an effect will result.

Figure 4:
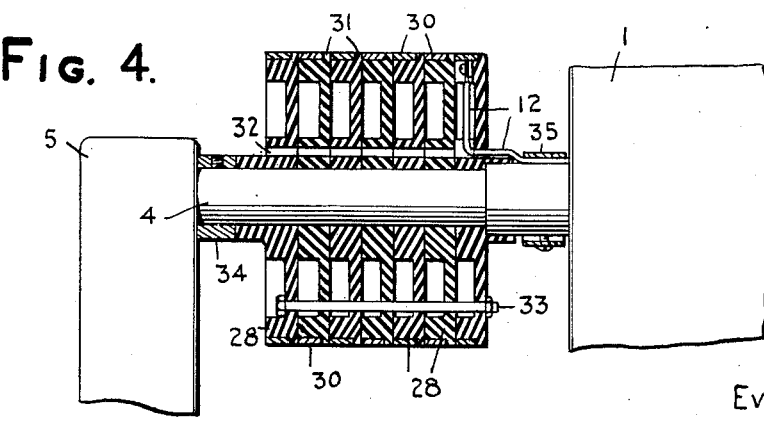
Fig. 4 is a longitudinal sectional view of one form of making the drum shown in Figs. 1, 2 and 3.

Fig. 4 is a longitudinal section through the drum shown in Figs. 1 and 3. Here the drum is made up of a plurality of radial sections or discs 28 of insulating material provided with an internal bore to fit the rotor shaft 4 and be fixed thereto. The peripheral surface of each section is recessed to provide for the reception of the collector and coil rings 30 as the case may be but with a remaining portion to provide a spacer 31 of insulating material between adjacent rings. Here, as in other forms of the drum, the wires are led radially inward toward the rotor shaft to openings 32 and thence along that shaft to the coils. An advantage of making the drum in radial sections lies in the fact that individual sections and rings may be kept in stock and sections going to make up the drum quickly assembled according to the number of coil rings needed. The sections of the drum may be united by fusion, adhesion or by bolts 33. A collar 34 may be employed to resist any tendency of the drum to move lengthwise of the shaft. A retaining band 35 serves to hold the wires close to the rotor shaft 4. The drum sections may be molded, turned or otherwise fabricated.

Figure 10:
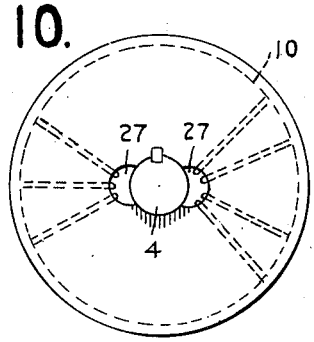
Fig. 10 is an end view of a solid type of drum.

The drum 8 of Figs. 1 and 3 may be fashioned in other ways. As shown in Fig. 10 it may be made from a solid piece of suitable insulating material bored internally to fit and be fixed to the rotor shaft 4. The peripheral or outer surface of the drum 8 may be molded with the collector and coil rings in place or turned or otherwise formed to provide a plurality of spaced recesses for the collector and coil rings and the latter then installed in place. As a measure of protection to the wires leading from the rings to the coils they may be led radially inward to openings 27 formed in the drum and thence along the rotor shaft 4 to the coils. By keeping these wires close to the shaft any tendency toward strain and chafing of the wires is reduced since the effects of centrifugal force arising from the rapid rotation of the drum is diminished as the axis of rotation is approached.

Figure 6:
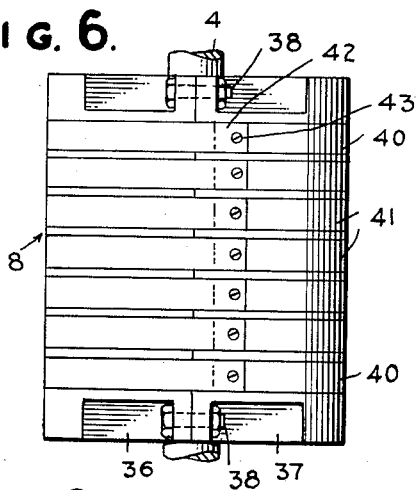
Fig. 6 is a plan view showing another type of drum.
Figure 7:
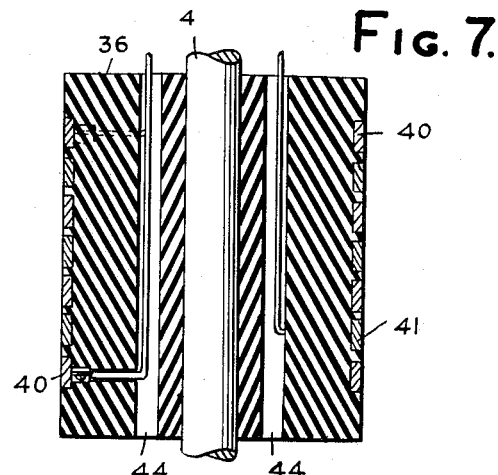
Fig. 7 is a longtiudinal sectional view of Fig. 6.

Figs. 6 and 7 show the drum 8 made up of half sections 36 and 37 of insulating material, fastened together by bolts 38 or other suitable means. Spaced recesses are provided for the reception of the collector and coil rings 40 and 41 respectively. The end of each ring may be rabbeted to provide a step joint 42 secured by screw 43 and the joint may be offset with respect to the line of junction of the drum sections. The drum will be internally bored to receive the rotor shaft 4 and fixed thereto. The drum sections may be molded, turned or otherwise formed. Wires leading from the collector and coil rings 40 and 41 respectively are by preference extended radially inward to openings 44 and thence along the rotor shaft 4 to the coils.

Figure 8:
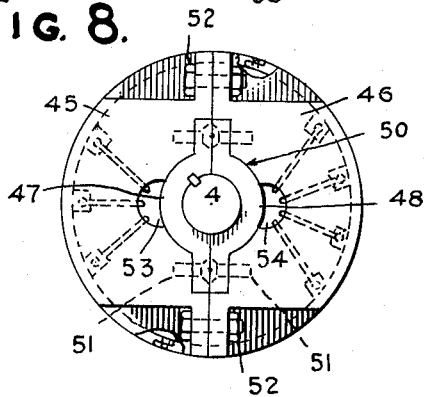
Fig. 8 is an end view of still another type of drum.
Figure 9:
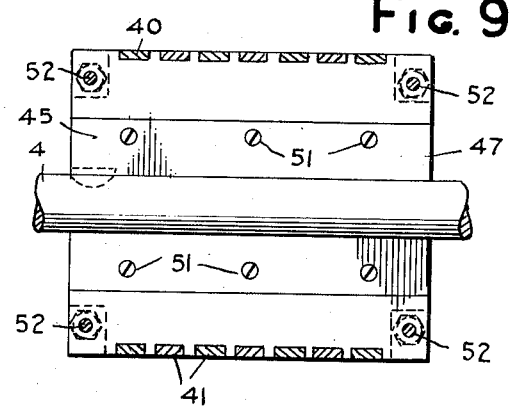
Fig. 9 is a longitudinal section of Fig. 8.

Figs. 8 and 9 show another form of drum with the collector and coil rings the same as in Figs. 6 and 7. Here the drum is shown as made of half sections 45 and 46. Each section is formed internally to receive complementary halves 47 and 48 of a bushing 50. Each half of the bushing is secured to its complementary drum half by screws 51 or other suitable means. The bushing is bored to receive the rotor shaft 4 and is fixed thereto. With this construction drums of an established size may be used with rotor shafts of different diameter by enlarging or diminishing the bore of the bushing 50 or keeping in stock a number of bushings with bores of varying diameters and changing bushings alone when occasion requires. The drum sections 45 and 46 are united by bolts 52 or other suitable means. As in the previously described drums the wires from the collector and coil range are extended radially inward to openings 53 and 54 and thence along the rotor shaft 4 to the coils.

Figure 12:
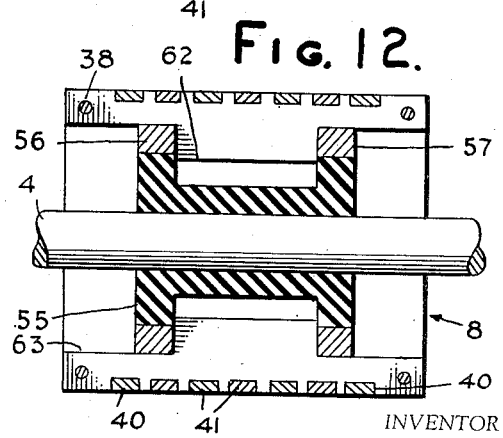
Fig. 12 is a longitudinal sectional view through the collector rings shown in Fig. 11 with a sectional drum applied thereto.

As previously suggested the invention may be applied temporarily for testing and indicating purposes to any standard wound rotor type motor without impairing its permanent structural characteristics. In Fig. 11 there is shown schematically the stator 1, rotor shaft 4, insulating hub 55, collector rings 56 and 57, brushes 58 and 60 engaging the collector rings and connected to a source of direct current, not shown, and a bracket 61 for supporting the brushes, all common and present in one form or another in a wound rotor type motor. In Fig. 12 there is shown the rotor shaft 4, the permanent insulating hub 55 and the permanent collector rings 56 and 57 of Fig. 11. A drum composed of sections 36 and 37 as shown in Fig. 6 will have its internal portion bored and counterbored as at 62 and 63 respectively according to the dimensions and location of the collector rings so as to fit over and cover them. The two drum sections 36 and 37 so fashioned are brought together and bolted as shown in Fig. 6, the fit being such that the drum is held in position on the permanent collector rings 56 and 57 with the ends of the collector and coil rings brought together and fastened as previously described. The wires leading from the temporary collector rings 40 and coil rings 41 will be temporarily clipped or connected to the permanent coil feed coil winding wires between the coils by way of insulation penetrating clips or by removing a small section of the insulation from the wires and making a temporary connection. When the test is completed the temporary collector and coil rings, testing wires and drum halves are disconnected and removed from the motor.

Since the drum 8 with its collector rings 40 and coil rings 41 is of larger diameter than the permanent collector rings 56 and 57 it will be necessary to adjust the brushes 58 and 60 outwardly or shim the bracket 61.

In Figs. 13 to 16, inclusive, another form of temporary testing arrangement is shown. Here, as in the case of Fig. 12, the temporary testing drum is fashioned over the standard motor construction shown in Fig. 11. The drum 64 of these figures consists of a plurality of individual segments 65 of wood or other insulating material having their under surfaces fashioned to fit snugly over the standard collector rings 56 and 57 shown in Figs. 11 and 15. The outer surfaces of the segments are recessed or grooved transversely as at 68 to receive the temporary collector rings 66 and coil rings 67 formed of coiled springs with their ends connected together. A sufficient number of segments encompass the permanent collector rings 56 and 57 to make up the drum as shown in Figs. 13 and 14 and to furnish an adequate support for the temporary collector and coil rings. The closed spring should be of such circumferential dimensions as to require stretching or expansion when applied to the grooves 67 and thus hold the segments in place. In fashioning the drum the individual segments may be fitted over the permanent collector rings 56 and 57 and the temporary collector and coil springs 66 and 67 then snapped over them into their respective grooves 67.

In Figs. 14, 15 and 16 the individual segments 65 are shown as secured to a continuous supporting and connecting band of flexible material 70 so as to constitute in effect a ribbon of segments. This ribbon may be formed by taking a rectangular piece of wood or other suitable insulating material and shaping it to the desired width and length. Grooves 68 are then routed longitudinally of the pieces on one side thereof to form the recesses for the temporary collector and coil rings. The opposite face of the piece is then rabbeted longitudinally as indicated in Fig. 15 at 71 so as ultimately to fit over the permanent collector rings 56 and 57. A length of continuous fabric or tape 70 is then applied adhesively to the piece lengthwise of the piece between the rabbets 71. The piece is then sawed or otherwise cut transversely from the opposite face of the piece down to but not through the fabric or flexible tape 70 to form the individual segments attached to each other by the flexible band. The ribbon or band of strips so formed is then wrapped around the permanent collector rings 56 and 57 as shown in Figs. 14 and 15 and fitted into place, following which the collector and coil rings are applied. Temporary wires 72 are connected to the coiled collector and coil testing rings 66 and 67 respectively and may be laid between the segments 65 as shown in Fig. 14 and are led thence to make a temporary connection with the permanent coil feed and winding wires as explained in connection with Figs. 11 and 12.

Here, as described in connection with Figs. 11 and 12 when the permanent collector rings are covered by the drum structure, it will be necessary to vary the position of the direct current brushes so as to accord with the temporary collector rings on the drum.

Figure 17:
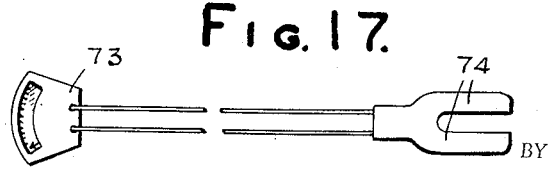
Fig. 17 shows a voltmeter with the spaced fingers for testing purposes connected thereto.

Since the testing drums suggested in Fig. 12 and Figs. 13 to 16 inclusive are temporary i. e., to be applied to standard motors for testing purposes and then removed therefrom it may not be desirable to erect beside the temporary drum the testing block 20, the bar 16 on which it slides and the bar supporting brackets 17 and 18 as shown in Fig. 1. In place therefor the portable indicating device shown in Fig. 17 may be employed. As shown it includes a voltmeter 73 and wires leading therefrom terminating in the contact or tap consisting of the spaced fingers 74 insulated from each other. This device can also be used in the case of permanently installed drums as herein described. In any event the size and spacing of the fingers 74 should be such that they will contact with a collector ring and the next adjacent coil ring or two adjacent coil rings so that individual coil readings will be obtained. Instead of using the figners 74 the free ends of the wires alone leading from the voltmeter may be used to contact or tap the adjacent rings in the manner just described.

What is claimed is:

1. In an electrical testing device for testing in situ and at normally operative rotary speed the series connected individual coils of a wound rotor alternating current synchronous machine, a stator surrounding said rotor and having the electrical windings thereof adapted to be connected to an alternating current main, a collector ring mounted on said rotor for rotation therewith and comprising a pair of main annular terminals and a plurality of auxiliary annular terminals insulated from each other for executing the test of said individual coils, a pair of brushes adapted for connection to a source of direct current in contact with said main annular terminals to operate the machine in a conventional manner, a conductor extending from the junction between each pair of said coils to one of said auxiliary annular terminals whereby a separate testing circuit for each coil is provided between adjacent annular terminals, and an electrical measuring instrument adapted to be applied successively to adjacent pairs of said annular terminals to determine the electrical condition of the respective coils connected to said last-mentioned terminal pairs under normal operating conditions.

2. In an electrical testing device for testing in situ and at normally operative rotary speed the series connected individual coils of a wound rotor alternating current synchronous motor, a stator surrounding said rotor and having the electrical windings thereof adapted to be connected to an alternating current main, a collector ring mounted on said rotor for rotation therewith and comprising a pair of main annular terminals and a plurality of auxiliary annular terminals insulated from each other for executing the test of said individual coils, a pair of brushes adapted for connection to a source of direct current in contact with said main annular terminals to operate the machine in a conventional manner, a conductor extending from the junction between each pair of said coils to one of said auxiliary annular terminals whereby a separate testing circuit for each coil is provided between adjacent annular terminals, a movable testing unit having a pair of contacts with a spacing conforming to the spacing between said annular terminals, and a moving coil type electrical measuring instrument connected to said pair of contacts adapted to be applied successively to adjacent pairs of said annular terminals to determine the electrical condition of the respective coils connected to said last-mentioned terminal pairs under normal operating conditions.

3. An apparatus as set forth in claim 2 provided with a support for said testing unit extending adjacent to said collector ring for guiding said unit rectilinearly along a line parallel to the axis of said collector ring and rotor.

4. An apparatus as set forth in claim 3 wherein said collector ring is composed of a plurality of annular disks of insulating material permanently clamped to each other on said rotor and carrying said main and auxiliary annular terminals on the peripheries of said disks.

5. An apparatus as set forth in claim 1 wherein is provided a rotary shaft for mounting the wound rotor, with the collector ring permanently mounted on said shaft.

6. An apparatus as set forth in claim 5 wherein said collector ring comprises a plurality of longitudinally divided sections of insulating material mounted upon correspondingly divided bushing sections adapted to be clamped upon said rotary shaft.

7. An apparatus as set forth in claim 1 provided with a rotary shaft for mounting the wound rotor and a pair of current feeding rings on said shaft for feeding current to the coils of said rotor, and means for detachably mounting said collector ring onto said current feeding rings and temporarily connecting the conductors from the current feeding rings to the main annular terminals and from the junctions between each pair of coils on the wound rotor to the auxiliary annular terminals.

8. An apparatus as set forth in claim 7 wherein said collector ring comprises a plurality of rigid longitudinally divided sections adapted to be clamped onto said shaft over said current feeding rings.

9. An apparatus as set forth in claim 7 wherein said collector ring comprises a plurality of spaced longitudinally extending segments of insulating material interconnected on their inner faces by a strip of flexible material and provided on the outer faces with a plurality of aligned transverse grooves accommodating expansible wire coils functioning electrically as said main and auxiliary annular terminals and functioning mechanically to yieldingly encompass said current feeding rings.

References Cited in the file of this patent

UNITED STATES PATENTS

| | | |
|---|---|---|
| 1,906,030 | Whelchel | Apr. 25, 1933 |
| 2,427,672 | Haydock | Sept. 23, 1947 |
| 2,471,808 | Baker | Mar. 31, 1949 |